United States Patent
Owens et al.

(10) Patent No.: US 8,166,289 B2
(45) Date of Patent: Apr. 24, 2012

(54) TRUSTED BOOT

(75) Inventors: John R. Owens, Carlsbad, CA (US);
John C. Andolina, Vista, CA (US);
Stuart Shanken, San Diego, CA (US);
Richard L. Quintana, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 615 days.

(21) Appl. No.: 12/366,602

(22) Filed: Feb. 5, 2009

(65) Prior Publication Data

US 2009/0198991 A1 Aug. 6, 2009

Related U.S. Application Data

(60) Provisional application No. 61/026,438, filed on Feb. 5, 2008.

(51) Int. Cl.
*G06F 9/00* (2006.01)
*H04L 29/06* (2006.01)
*H04N 7/16* (2011.01)

(52) U.S. Cl. ............... 713/2; 713/153; 726/26
(58) Field of Classification Search ........... 713/2
See application file for complete search history.

(56) References Cited

U.S. PATENT DOCUMENTS

| | | | |
|---|---|---|---|
| 6,378,072 B1 * | 4/2002 | Collins et al. ............... 713/187 |
| 7,376,968 B2 * | 5/2008 | Ritz et al. ................... 726/17 |
| 7,555,121 B2 * | 6/2009 | Tham et al. .................. 380/29 |
| 2002/0150252 A1 | 10/2002 | Wong |
| 2006/0026417 A1 * | 2/2006 | Furusawa et al. ............. 713/2 |
| 2006/0059369 A1 | 3/2006 | Fayad et al. |
| 2006/0265603 A1 | 11/2006 | McLean et al. |
| 2007/0220369 A1 | 9/2007 | Fayad et al. |
| 2009/0119503 A1 * | 5/2009 | Isaakian et al. ............. 713/153 |

OTHER PUBLICATIONS

PCT International Search Report and Written Opinion mailed Sep. 30, 2009; International Application No. PCT/US2009/033269, 11 pages.
McLean et al., "FPGA-based single chip cryptographic solution (U)", Special Cover Feature, Military Embedded Systems, © 2007 OpenSystems Publishing, 4 pgs.

* cited by examiner

*Primary Examiner* — Suresh Suryawanshi
(74) *Attorney, Agent, or Firm* — Kilpatrick Townsend & Stockton LLP

(57) ABSTRACT

In one embodiment, a method for trusted booting of a cryptographic processor system is disclosed. Default image(s) is loaded into a field-programmable logic chip or circuit (FPLC). The default image(s) cannot perform cryptographic processing, but can perform a first algorithm that is unclassified. A processor, internal or external to the FPLC, can be used with the default image. A multi-layer or multi-part key has portions stored in two different places. A protected image is decrypted with the multi-layer key using the first algorithm and loaded into the FPLC. Cryptographic processing is performed using a second algorithm classified by the government.

22 Claims, 17 Drawing Sheets

TRUSTED BOOT

This application claims the benefit of and is a non-provisional of U.S. Provisional Application Ser. No. 61/026,438 filed on Feb. 5, 2008, which is hereby expressly incorporated by reference in its entirety for all purposes.

This application expressly incorporates by reference each of the following co-pending patent applications in their entirety for all purposes: U.S. application Ser. No. 12/366,619, filed Feb. 5, 2009, entitled "Overlapping State Areas for Programmable Crypto Processing Circuits"; and U.S. application Ser. No. 12/366,600, filed Feb. 5, 2009, entitled "System Security Manager".

BACKGROUND

This disclosure relates in general to field-programmable logic chip or circuit (FPLC) and, but not by way of limitation, to FPLC used in traffic processing such as cryptographic processing.

Programmable circuitry is common in logic design, but achieving the level of security and high-assurance desired by the governments, individuals and certain businesses has been difficult. Programmability is seen as a risk to achieving security and high-assurance. This is especially true when programmability is utilized in the field. One could imagine the programmability feature being used to cause the FPLC to operate in a mode that would not have the required security.

Cryptographic circuitry can fail or be compromised. Where such a circuit enters an error mode, there is no recovery. Failure can result in insecure functioning that is not desirable. The cryptographic circuit can erase keys to prevent further activity. Even without keys, the cryptographic circuit can perform in undesirable modes when malfunctioning. With programmability, the risk of these malfunctions is greater.

FPLCs have many advantages over fixed circuitry, but cost is generally not one of the advantages. Various images and soft cores are loaded into FPLCs. The size of the FPLC is chosen to accommodate all the images needed for a given design. When smaller or fewer FPLCs are possible, the costs of producing a unit decreases.

SUMMARY

In one embodiment, a method for trusted booting of a cryptographic processor system is disclosed. Default image(s) is loaded into a field-programmable logic circuit or chip (FPLC). The default image(s) cannot perform cryptographic processing, but can perform a first algorithm that is unclassified. A processor, internal or external to the FPLC, can be used with the default image. A multi-layer or multi-part key has portions stored in two different places. A protected image is decrypted with a key using the first algorithm and loaded into the FPLC. Cryptographic processing is performed using a second algorithm developed or classified by the government.

In one embodiment, the present disclosure provides a method for booting with multi-layered security that cryptographically processing information. The method includes loading a default image into a FPLC. The default image prevents the FPLC from passing information from a first port to a second port. The default image includes a first algorithm that is unclassified by the government and allows operational software to function. The method also includes loading a multi-layered key. The first layer of the multilayer key is stored separate from a second layer of the multilayer key and the first and second layers are used to formulate the multi-layer key. The method also includes decrypting a protected image using the multi-layered key and the first algorithm to produce a decrypted image from the encrypted protected image. The method also includes loading the decrypted image into the FPLC. The also further includes performing cryptographic processing using the decrypted image and a classified second algorithm. The cryptographic processing operates on information passing from the first port to the second port.

In one embodiment, the present disclosure provides a cryptographic processing system for booting a FPLC with multi-layered keys. The system includes a first port for receiving information for cryptographic processing and a second port for transmitting information after cryptographic processing. The system also includes a default image loaded in the FPLC. The default image prevents the FPLC from passing information from a first port to a second port. The default image includes a first algorithm that is unclassified by the government. The default image allows operational software to function. The system also includes a multi-layered key. A first layer of the multilayer key is stored separate from a second layer of the multilayer key and the first and second layers of the multilayer key are used to formulate the multi-layer key. The system also includes a protected image that is decrypted using the multi-layered key and the first algorithm to produce a decrypted image. The decrypted image is loaded into the FPLC. Cryptographic processing is performed using the decrypted image and a second algorithm, which is classified or provided by the government. The cryptographic processing operates on information passing from the first port to the second port.

In one embodiment, the present disclosure provides a cryptographic processing system for booting a FPLC with multi-layered keys. The cryptographic processing system includes a first means for loading a default image into a field-programmable logic chip (FPLC). The default image prevents the FPLC from passing information from a first port to a second port. The default image includes a first algorithm that is unclassified by the government and allows operational software to function. The cryptographic processing system also includes a second means for loading a multi-layered key. A first layer of the multilayer key is stored separate from a second layer of the multilayer key. The first and second layers are used to formulate the multi-layer key. The cryptographic processing system also includes a means for decrypting a protected image using the multi-layered key and the first algorithm to produce a decrypted image. The cryptographic processing system also includes a third means for loading the decrypted image into the FPLC. The cryptographic processing system also includes a means for cryptographically processing that uses the decrypted image and a second algorithm, which is classified or provided by the government. The cryptographic processing operates on information passing from the first port to the second port.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

I. Trusted Boot

Figure 1A:
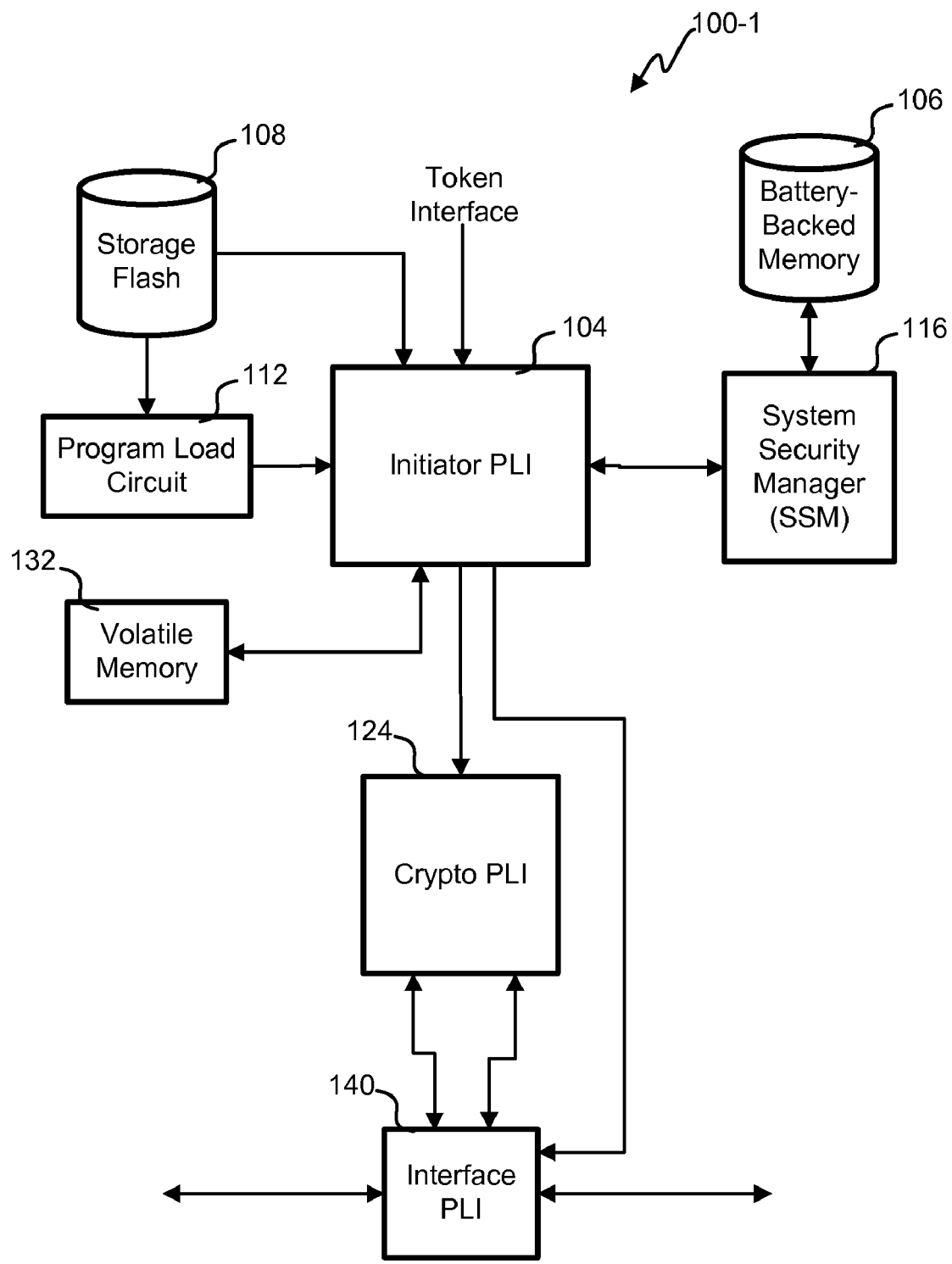
FIGS. 1A, 1B and 1C depict block diagrams of embodiments of a cryptographic processor system.

Referring first to FIG. 1A, a block diagram of an embodiment of a cryptographic processor system 100-1 is shown. There are a number of field-programmable logic chips or circuits (FPLCs) in this embodiment, which may be field-programmable gate arrays (FPGA), programmable logic devices (PLDs), complex PLDs (CPLDs), or any other circuit that can be programmed with some logic or a soft core after manufacture, for example, in the field. Programmability in the field includes programmability while manufacturing a system including the FPLC or programmability while the system is deployed with an end user. A FPLC is a circuit chip or die in it's own package or chips or dice in a multi-chip module.

A programmable logic image (PLI) is a soft core of functionality that can be programmed into a FPLC or otherwise implemented. The PLI could include general purpose processor, a state machine, an application specific processor, a cryptofunction, and/or configuration information and parameters. A number of PLIs may be in a single FPLC or a single PLI may be spread out among a number of FPLCs. The blocks shown in the figures can be combined or split in various embodiments.

A number of PLIs are used to process traffic or more specifically, cryptographically process traffic. Plain text information is received by the interface PLI 140 for encryption processing, and cipher text information is output by the interface PLI 140. Conversely, cipher text information is received by the interface PLI 140 for decryption processing, and plain text information is output by the interface PLI 140.

The interface PLI 140 can pass information without cryptographic processing in some cases. For example, the three PLIs 104, 124, 140 in this embodiment could be implemented in one or two FPLCs with the first holding the initiator PLI, the second holding the interface PLI and the crypto PLI divided between the two FPLCs.

A crypto PLI 124 performs cryptographic processing in a traffic processing state. These are just representative blocks for performing cryptographic processing and could be combined or separated in various embodiments. If loaded into the same FPLC, PLIs can be isolated from each other with a buffer of unused cells and controlled interfaces between the isolated areas. Signals from one PLI can be kept from routing outside the isolated area except where a deliberate port is configured to pass information between PLIs. In this way, isolation can be achieved in the same device unless interaction through a port is desired.

Soft cores for the various PLIs in their various versions are held in a storage flash 108. These soft cores are sometimes referred to as images. Additionally, key fragments or layers can be held in the storage flash 108. The storage flash 108 can additionally hold software to boot and run any processor of the cryptographic processor system 100. Any type of flash memory or non-volatile can be used for the storage flash 108.

This embodiment also includes volatile memory 132. A processing core within the initiator PLI 104 loads software from the storage flash 108 and uses the volatile memory 132 for program operation and variable storage. RAM, SRAM or any type of volatile memory could be used for the volatile memory 132. Other embodiments could use non-volatile memory, for example, MRAM for the volatile memory 132.

A battery or other power source (not shown) is used to allow a battery-backed memory 106 to retain its contents even when main power is interrupted or lost. SRAM or DRAM can be used for the battery-backed memory. The battery-backed memory 106 may also hold key layers. In one embodiment, some key layers are stored in the storage flash 108 while others are stored on the battery-backed memory 106. Further, key layers can be held on a token that is removably coupled to the cryptographic processor system 100 through a token interface. Any type of non-volatile memory can be used for the storage flash 108, the battery-backed memory 106 or token.

The program load circuit 112 loads soft cores for the PLIs into one or more FPLCs. The program load circuit 112 could be implemented with a CPLD, for example. The various images or soft cores in the storage flash 108 are loaded into the programmable logic in a particular sequence that can be controlled by the program load circuit 112 and/or the loaded PLIs. Certain PLIs can be loaded into the programmable logic and later removed such that other PLIs can recover some of the programmable logic when the removed PLIs are not needed.

An initiator PLI 104 may assist in this process and perform other configuration once the soft core of the initiator PLI 104 is loaded and functioning. Certain configuration actions such as loading keys, built-in test and other housekeeping functions can be performed by the initiator PLI 104. In some embodiments, the soft core of the initiator PLI 104 may be removed if not needed and reloaded when it is needed. Memory can be used to pass information from the initiator PLI 104 to other PLIs to use when the initiator PLI is not loaded.

As further described below, the system security manager (SSM) 116 monitors for errors and alarms before taking remedial action on the PLIs, FPLCs and/or key layers. Redundancy can be used by the SSM 116 to operate in a failsafe, trusted and/or high-assurance manner.

Figure 1B:
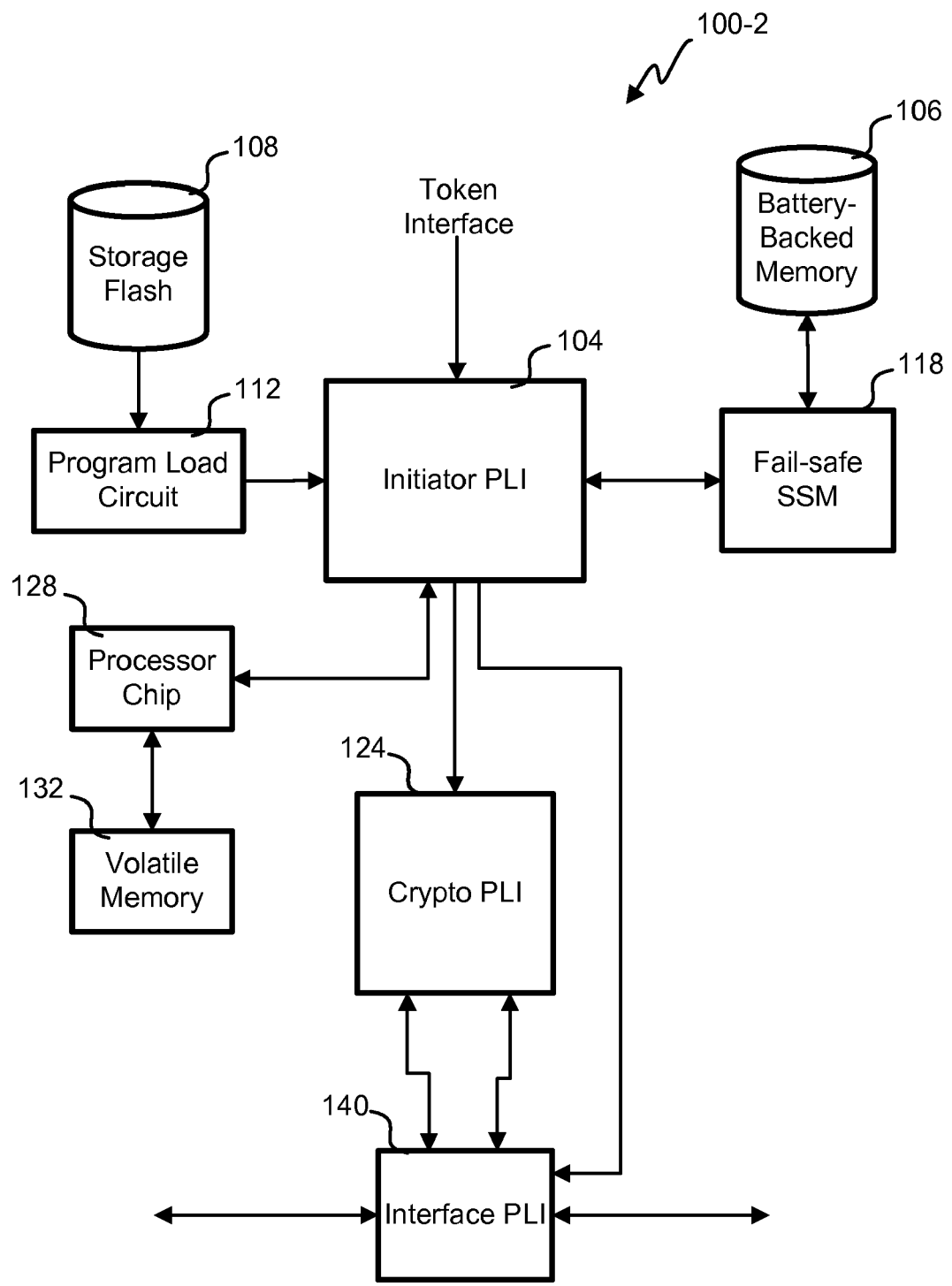

Referring next to FIG. 1B, shows a block diagram of another embodiment of the cryptographic processor system 100-2 that uses a fail-safe SSM 118 instead of a SSM 116. The fail-safe SSM 118 includes redundancy and/or other high-assurance circuits as further described below. This embodiment also includes a processor chip 128 instead or in addition to a processing soft core within the initiator PLI 104. The processor chip 128 is a hardware processor separate from the FPLC holding the initiator PLI 104. Volatile memory 132 is used by the processor chip 128 for program operation and variable storage.

Figure 1C:
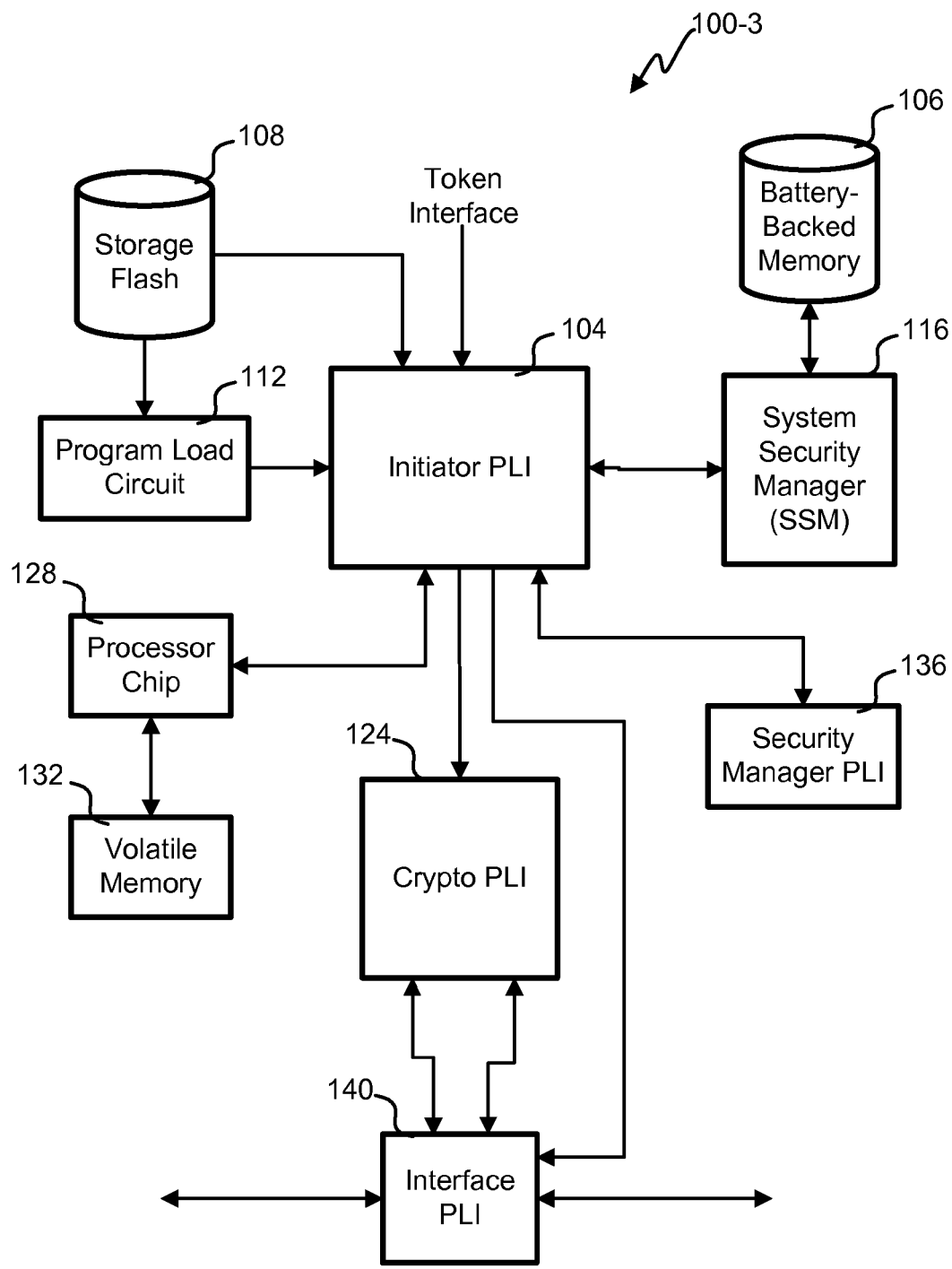

With reference to FIG. 1C, a block diagram of yet another embodiment of a cryptographic processor system 100-3 is shown. This embodiment includes a security manager PLI 136 that is embedded in a FPLC. Some or all of the FPLCs used in the cryptographic processor system 100 could have its own security manager PLI 136. The security manager PLI could be used in addition to a SSM 116 or a fail-safe SSM 118 in various embodiments. The security manager PLI 136 is further described below.

Figure 3:
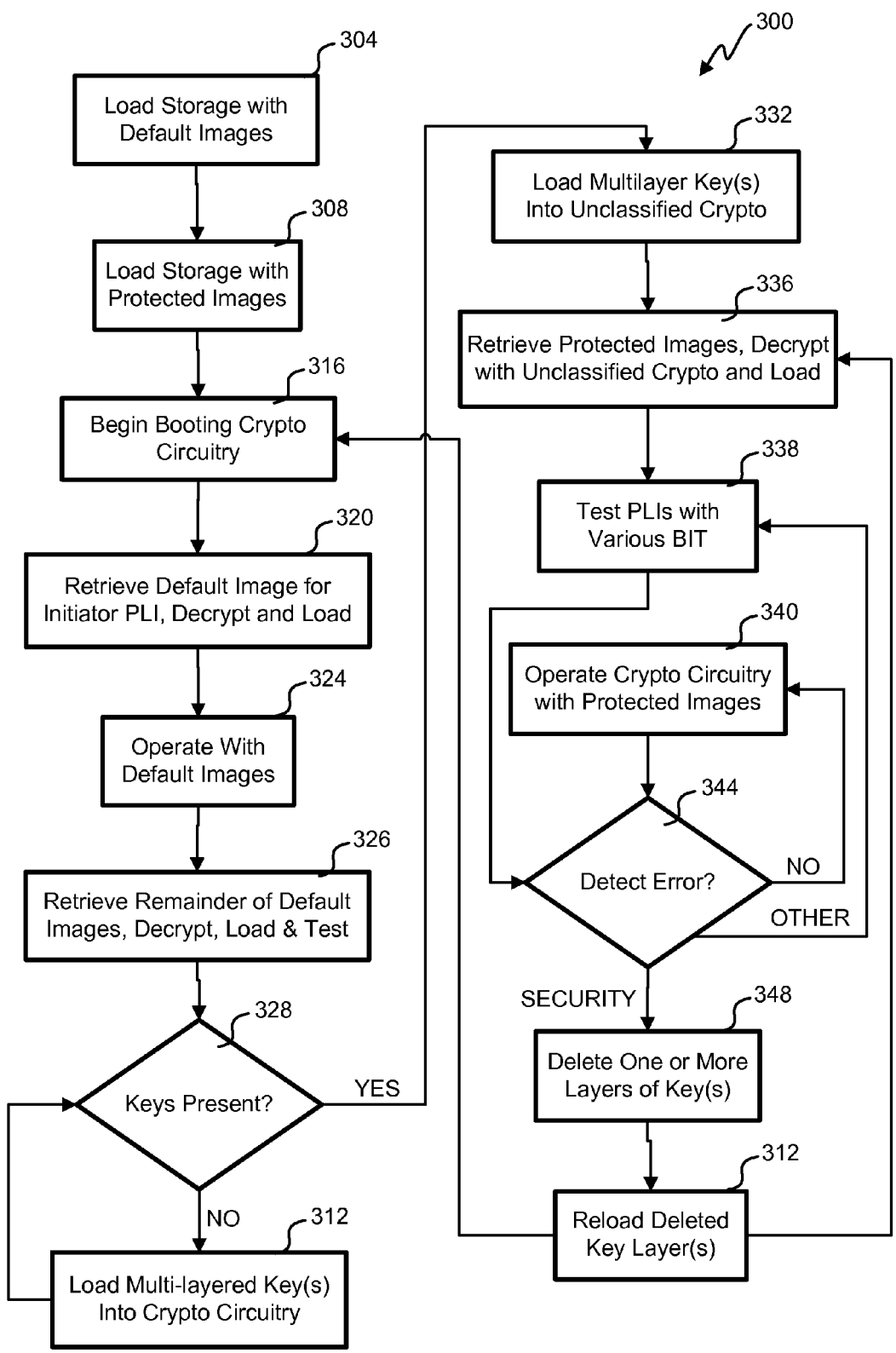
FIG. 3 illustrates a flowchart of an embodiment of a process for booting a cryptographic processor system.

Referring next to FIG. 3, a flow chart of an embodiment of a process 300 for booting a cryptographic processor system 100 is shown. The depicted portion of the process begins in block 304 where the storage flash 108 is loaded with one or more default images. Some FPLCs have a decryption algorithm built into the chip to be programmed that uses a fixed key to allow decryption of images loaded into that chip. For example, Xilinx™ and Altera™ could provide on-chip advanced encryption standard (AES) decryption of images using a predetermined key that is fixed and battery-backed on the chip. Block 304 would include encrypting the default image(s) with the appropriate key prior to storage in the storage flash 108.

The default images provide just enough logic to get the cryptographic processor system 100 running in a configuration state, but not enough to allow data throughput in this embodiment. For example, the initiator PLI 104 can be a default image in some embodiments. The default images support built-in-test to allow checking that the logic circuitry at least has some functionality and that the circuit card was assembled properly. Other embodiments could do certain unclassified traffic processing with the default images. A loaded default image allows running and updating of the operational software. Additionally, the default images include another decryption algorithm that is unclassified. This unclassified decryption algorithm is a soft core that can be loaded into FPLC to allow decrypt and load of additional logic in the same chip or another chip.

In the United States, the government classifies certain cryptographic algorithms while others are unclassified. Classified algorithms are not available to the general public and are controlled by government regulation. Each country can have their own classified and unclassified cryptographic algorithms which may vary from other countries. As the control of classified and unclassified algorithms differs in a particular country, embodiments use a mixture in certain circumstances.

In block 308, protected images are loaded into the storage flash 108. These may be optionally encrypted to allow decoding with the on-chip decryption algorithm. The protected images are encrypted to allow decryption with the unclassified decryption algorithm and an appropriate key. The protected images allow full cryptographic processing when properly loaded and enabled with the appropriate key(s). In one embodiment, a particular portion of a FPLC or a whole programmable FPLC could start out with a default image that is later replaced wholly or in part with another protected or unprotected image. Other embodiments could keep some or all of the default image functioning alongside protected images.

Operation of the cryptographic processor system 100 is begun in block 316. Prior blocks 304, 308 and 312 could be performed at the factory in one embodiment. Block 312 is likely to be done at least partially in the field as layers of the multi-layered key may change over time or be erased. Booting may be begun by application of power to the cryptographic processor system 100 or by a reset operation or other remedial action.

One or more default images are retrieved from the image flash storage 108 and loaded into programmable logic by the program load circuit 112 in block 320. For example, the initiator PLI 104 could be loaded as a default image. The default image(s) may be encrypted and a previously-loaded default image, such as the initiator PLI 104, could automatically decrypt the default image before loading into the programmable logic. Other embodiments may use the cryptographic function built into some FPLCs as explained above. Yet other embodiments could use the built-in cryptographic function and a soft core cryptographic function to utilize double decryption. Embodiments may have various blocks implemented in one or more PLIs to separate different functions within a given FPLC.

Once the initiator PLI 104 has the default image loaded in unencrypted form, a general purpose processor is available as a soft core that was part of the default image. Other embodiments could use a hard core for the processor used by the initiator PLI and external to any FPLC. Memory is available for processing and retrieval of operational software that is booted in block 324. Once the default software is loaded there is enough intelligence to accept new software and/or keys, but no cryptographic processing of traffic can be done in this embodiment of the default software. In this embodiment, the initiator PLI 104 has the unclassified decryption algorithm as a soft core or available in software. The PLIs operate with default images in block 324.

The initiator PLI retrieves the remainder of the default images in block 326. Those default images are loaded using optional decryption before built-in-test is performed on each of the other PLIs. During the loading process, verification of checksums, CRCs or hashes can be performed to confirm the default images were loaded correctly. The initiator PLI 104 can reload the default images where there is an error in the checksum, CRC or hash.

A determination in block 328 analyzes whether there are multi-layer keys present to continue booting the cryptographic processor system 100. The multi-layer key is reconstituted by retrieving various layers or portions from different locations. For example, the storage flash 108, the token and/or the battery-backed memory 106 may all have a portion of the multi-level key. Where one or more layers of the multi-layer key is missing processing loops back to block 312 to wait for loading of a missing key layer(s). If the multi-layer key is present, processing goes from block 328 to 332, but goes from block 328 to block 312 if the multi-layer key is missing.

The multi-layered key(s) are loaded into the cryptographic processor system 100 in block 312. The multi-layered key has multiple portions that are all needed by the unclassified decryption algorithm to decrypt the protected images. Layers of the multi-layered key(s) can be erased if error conditions are found. Without all of the layers, the multi-layered key will not be usable. A battery-backed memory 106 and/or flash may be used to store the various layers of the multi-layered key.

This embodiment stores various layers or values of the keys in the storage flash 108, the battery-backed memory 106 and/or a token coupled to a token interface. The layers may additionally be encrypted, for example, the layer retrieved from the storage flash 108 is encrypted in one embodiment. Some locations may store multiple layers or portions of the multi-layer key, for example, the battery-backed memory 106 could have two portions that can be individually erased or scrambled to destroy the multi-layer key. The condition for destroying each layer of the key could be different to protect against different threats. Once the multi-layered key is loaded, processing goes from block 312 back to block 328.

In block 332, the initiator PLI 104 loads a soft core version of the unclassified decryption algorithm. The unclassified decryption algorithm could be AES, triple-DES or any other appropriate algorithm. The multi-layer key is constituted by retrieving layers from two or more locations. The protected soft cores are retrieved from the storage flash 108 and decrypted by the initiator PLI 104 in block 336. Some embodiments may also use the AES encryption built into the FPLC to utilize double decryption. That second order of protection of the AES encryption would involve decryption again as the protected image is loaded into a particular FPLC. Additionally, the initiator PLI 104 may calculate a checksum or hash as un soft core is loaded. The initiator PLI 104 can compare the checksum or hash against a predetermined value to confirm the soft core was loaded correctly. The initiator PLI 104 can reload the protected image where there is an error in the checksum or hash.

The PLIs loaded with their default or protected images can be tested various built in tests (BIT) in block 338. For example, known result verifications could be performed where a known input is fed to one or more PLIs to determine if a known output is produced during a known answer verification. Other possible testing of the PLIs can be performed such as scan chain testing, check words, check sums, boundary scan, integrity test, and other tests. After completion of block 338, the cryptographic processor system 100 is in a trusted state. Beyond testing, the trusted state is implemented with redundancy in this embodiment.

Monitoring is performed in block 344 for error conditions after the known answer and other verifications. Where they are conditions that could indicate a security concern, one or more layers of the multi-layer key are deleted in block 348 before looping back to block 312 to wait for a new key layer load, which may be manually or automatically performed. From block 312, the booting process could loop back to either block 316 or block 336 depending on the severity of the error. With other errors detected in block 344, processing goes from block 344 to block 338 to test the PLIs again without removal of one or more key layers. In the absence of errors detected in block 344, the cryptographic processor system 100 is available to encrypt and decrypt traffic in a fully operational mode in block 340. Testing continues in block 344 during operation either periodically, upon certain events or when errors are suspected.

II. System Security Manager

FPGAs and/or FPLCs may have security manager PLI 136 for programming into the FPLC. For example, Xilinx™ and Altera™ have envisioned a security manager PLI 136. The security manager PLI 136 is a soft core in this embodiment. Periodically, the security manager PLI 136 can check the other soft cores loaded into the FPLC to confirm they match what was originally loaded. Changes in the loaded programming could be detected in this manner. When an error condition is detected, the security monitor can erase the programming from within the FPGA or FPLC such that it returned to an inoperable state. The programmed-in security manager PLI 136 is not redundant. Additionally, these approaches presume that the security manager PLI 136 is operating properly despite other problems detected within the FPLC.

Figure 2A:
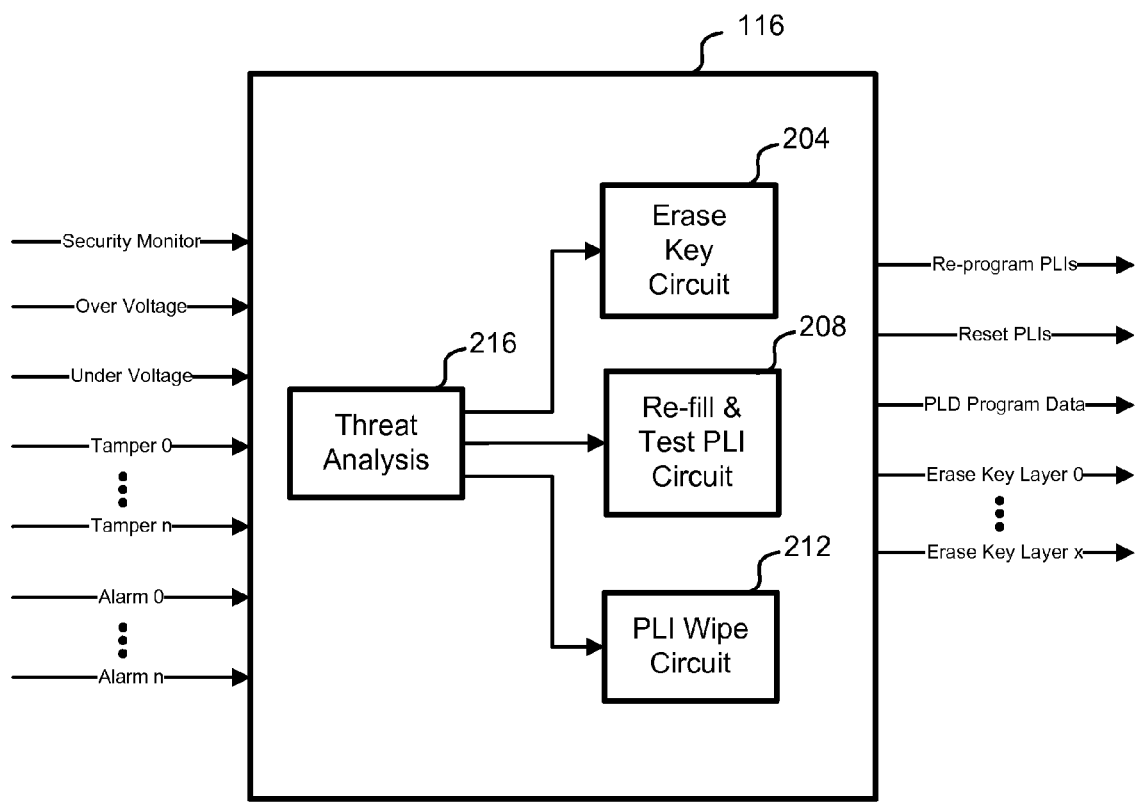
FIG. 2A depicts a block diagram of an embodiment of a system security manager (SSM)

With reference to FIG. 2A, an embodiment of a SSM 116 is shown. In one embodiment, we include a SSM 116, that has circuitry external to the FPLCs housing the PLIs. The SSM 116 can activate the internal security monitoring circuit to erase the programming in a FPLC and/or may just overwrite the programming, reset the logic or otherwise prevent further operation of the FPLC. The SSM 116 can work in conjunction with the security monitor or replace the function of the security monitor. In this embodiment, the SSM 116 is outside the FPLC used for other PLIs, but could be implemented in an ASIC, FPGA, CPLD, or PLD. In this embodiment, a CPLD is used to implement the SSM 116 and is not field reprogrammable. Other soft cores or PLIs could be included in the FPLC used by the SSM 116 in other embodiments.

Many conditions are observed by the SSM 116, that may cause security measures to take place. Things like battery voltage over or under specification, tamper of any circuitry or enclosure, alarm conditions, triggering of a FPGA's or FPLC's security monitor are all conditions that are observed. Based on an analysis of the threat, the SSM 116 can erase/overwrite/reset PLIs and/or FPLCs, keys, and/or key portions or layers. For example, the system security monitor 116 may receive an indication that a particular FPGA security monitor found a single point failure and erased the FPGA. The system security monitor 116 could respond by writing an erasing or initialization program into the FPGA before reprogramming it once again. Certain conditions only result in erasing and/or reprogramming a portion of a PLI, a whole PLI, multiple PLIs, a FPLC, or multiple FPLCs.

This embodiment has a number of security functions that are activated based upon how the inputs are interpreted by a threat analysis circuit 216. The threat analysis circuit 216 can activate an erase circuit 204, a PLI wipe circuit 212 and/or a re-fill and test PLI (RATP) circuit 208. The erase key circuit 204 could erase, overwrite and/or otherwise disable a key. A layer of a multi-layer key may be erased or overwritten to effectively disable use of the multi-layer key even though other layers of the multi-layer key are still available. Where keys should be disabled, for example, the erase key circuit 204 can erase layers in the battery-backed memory 106, the token and/or the storage flash 108.

The testing of the PLI in the RATP circuit 208 can be built-in-test, security monitor tests, known answer verifications or the like. Re-filling of the PLI can be of the original image, a default image or a null image. Although this embodiment of the RATP circuit 208 and PLI wipe circuit 212 operate at the PLI level, other embodiments could also optionally operate on one or more FPLCs.

Figure 2B:
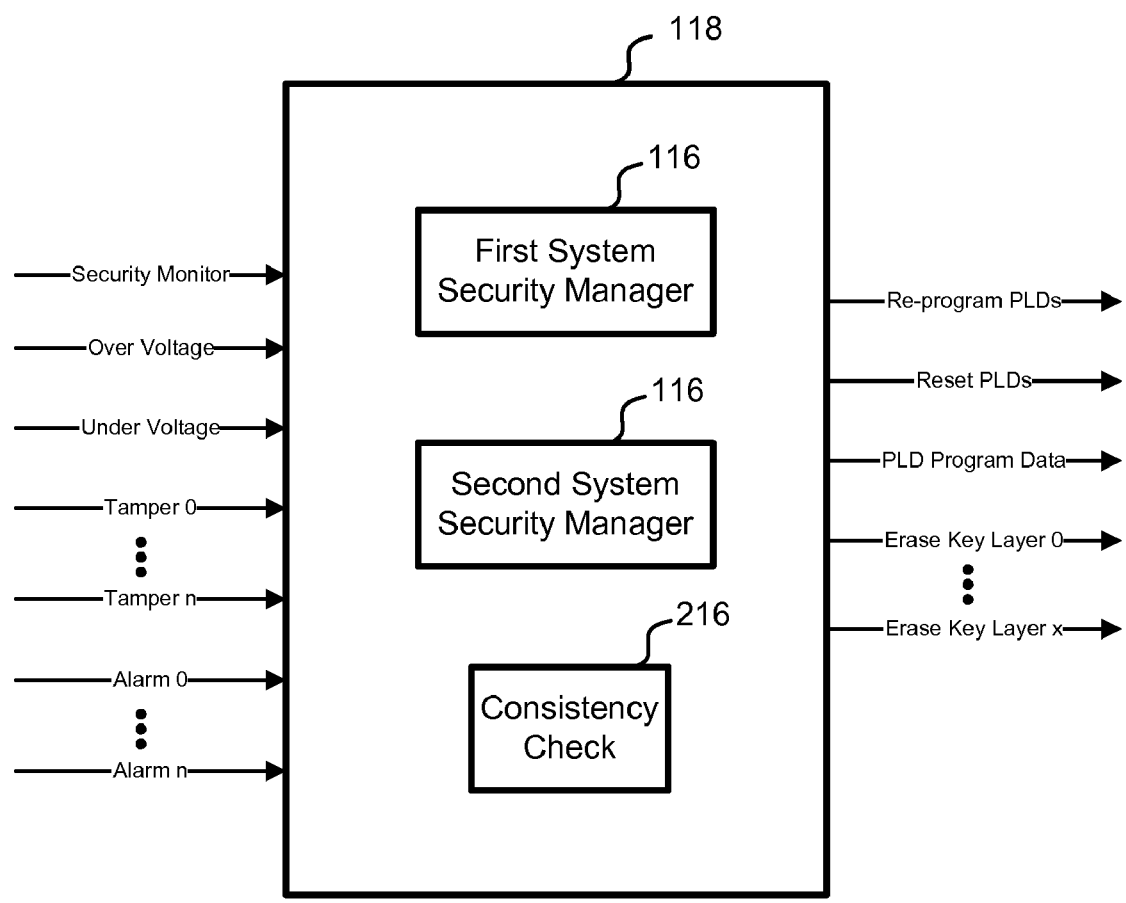
FIG. 2B depicts a block diagram of an embodiment of a fail-safe SSM.

Referring next to FIG. 2B, an embodiment of a fail-safe SSM 118 is shown that uses redundant SSMs 116. The embodiment of the SSM 116 in FIG. 2A does not operate in a failsafe mode that is trusted according to some criterions. This embodiment duplicates of all the circuitry in the SSM 116 such that both copies would have to perform the same way or that would cause an alarm condition. In this way, any failure of one of the SSMs 116 would cause an erasure of the various PLIs, FPLCs, key layers, and/or keys. A consistency check circuit 216 compares inputs and outputs of the parallel SSMs 116 to assure there are matches. If one SSM 116 goes haywire, the PLI containing the fail-safe SSM 118 can be erased after possibly erasing one or more keys or key layers.

III. Overlapping State Areas for Programmable Crypto Processing Circuits

High-assurance and classified applications generally avoid use of PLIs or FPLCs. There are concerns that the reprogramability of these devices will leave them vulnerable to compromise. When operating these devices certain logic circuits are only used in certain states. For example, crypto processing systems configure the traffic engine before operating the traffic engine to process information. An embodiment reuses at least some of the same device resources for a configuration state and a cryptographic processing state.

Figure 4A:
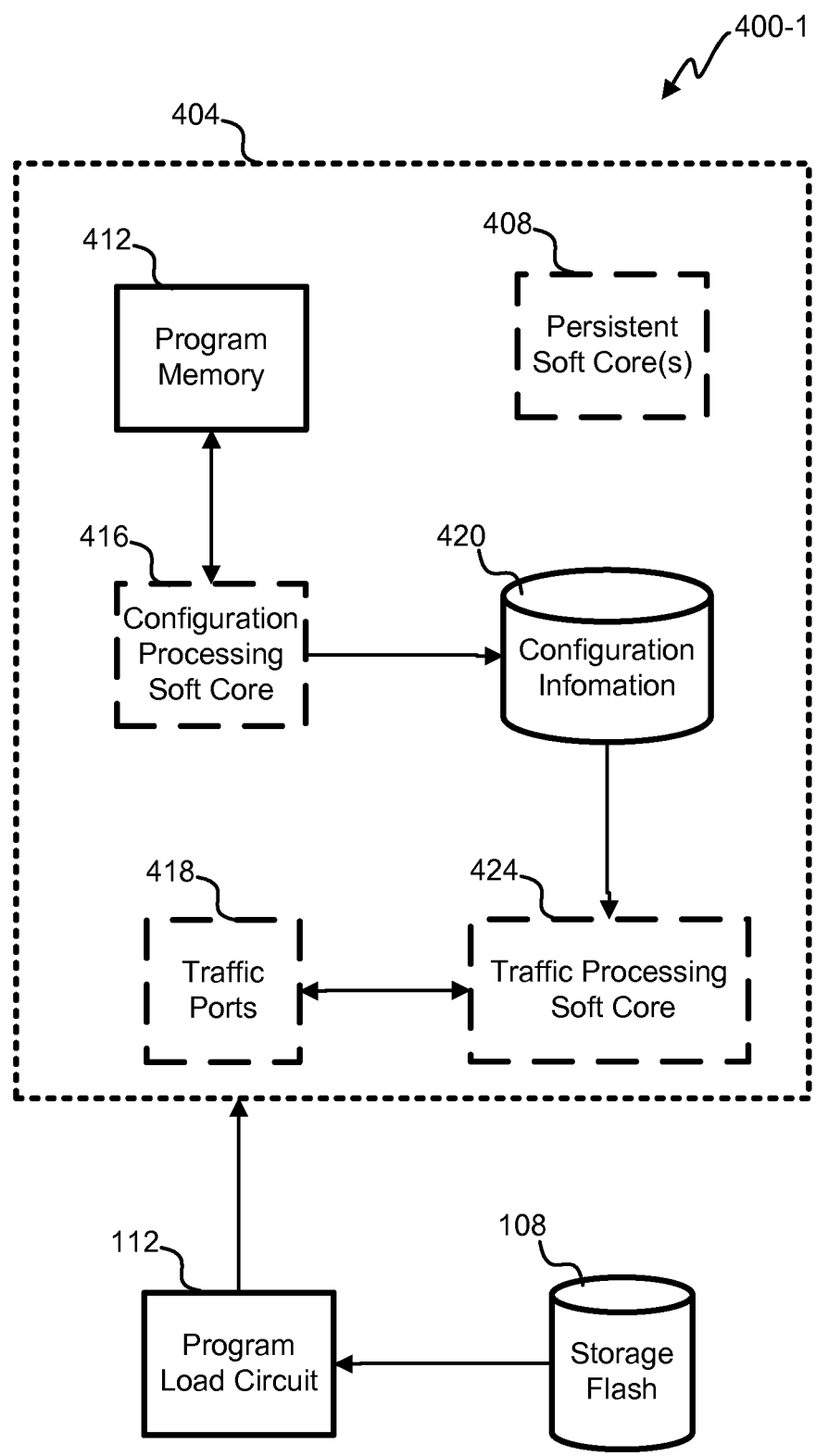
FIGS. 4A, 4B, 4C and 4D depict block diagrams of embodiments of a traffic processing system.

Referring to FIG. 4A, a block diagram of an embodiment of a traffic processing system 400-1 is shown. The traffic processing could be cryptographic or other processing on data. This embodiment processes data in a manner that can tolerate delays associated with switching into a configuration state when necessary to perform configuration and any key management before switching back to a traffic processing state to operate upon more data. The traffic processing system 400 has a program load circuit 112 that loads multiple soft cores into the traffic processor 404 from the storage flash 108. The program load circuit loads soft cores as a function of the operational state of the traffic processor 404.

Included in the traffic processor 404 at various times are a traffic processing soft core 424, a configuration processing soft core 416, a persistent soft core 408, traffic ports 418, a program memory 412, and a configuration information store 420. Soft cores are outlined in the figure with dashed lines and are loaded into a FPLC as images by the program load circuit 112. The program memory 412 holds software for execution by the configuration processing soft core 416. The software can be loaded by the program load circuit 112. One or more storage media within the FPLC that implements the traffic processor are used for the program memory and the configuration information store 420 in this embodiment.

The program load circuit 112 has pointers to know where the various images are loaded in the storage flash 108 for the various states. The next state is communicated to the program load circuit 112 and the pointer is found to know which addresses from the storage flash 108 to feed into the traffic processor FPLC 404. The stream of programming information is fed from the storage flash 108 into the programming interface of the FPLC by the program load circuit.

The configuration processing soft core 416 performs configuration for the other states of operation, for example, key loading and management, decryption of classified images, built-in test, etc. In this embodiment, the configuration processing soft core 416 includes a processor, but other embodiments could perform the same actions without use of a processor. The produced configuration information is recorded in the configuration information store 420 and includes various things such as decoded keys, operational parameters, cryptographic algorithm variables, data ports to use, configuration of data passed to/from the traffic processing soft core 424.

The persistent soft core 408 could be used for loading PLIs or soft cores, optionally decrypting PLIs or soft cores, managing keys and security, and/or a state machine for flipping between the various cores used by the various states. In this embodiment, the persistent soft core 408 aids in loading images and storing semaphores or parameters that are passed between states. The state machine for flipping between various cores could be external to the traffic processor 404 in some embodiments. Other embodiments could have transitions to another state decided by a loaded PLI or soft core. For example, when the traffic processing soft core 404 detected an error that required reset, it could trigger loading the configuration processing soft core 416 and pass it the appropriate parameters.

For FPLCs that have partial reconfiguration, the state machine and image loading logic can be within the FPLCs to allow the state machine to remain during reprogramming of the FPLC. Other embodiments could have the image loading logic external when the FPLC does not support partial reconfiguration. The reconfiguration of the entire FPLC could triggered by a state machine that would be overwritten in the process of reconfiguring. The new configuration could have a new state machine capable of triggering a transition to another state that would use the external image loading logic to load a new image into the FPLC.

Once configuration is complete, this embodiment has no further need for a general-purpose processor. The traffic processing soft core 424 and traffic ports 418 can be loaded by the program load circuit and consume some of the same resources in the device that were consumed by the configuration processing soft core 416. The traffic processing soft core 424 does not use any software and instead is controlled by state engines in this embodiment. Information needed for the traffic processing soft core 424 are available from the configuration information store 420 in the traffic processing state. The traffic ports 418 are used by the traffic processing soft core 424 to send and receive information with the traffic processor 404. Other embodiments could avoid use of general-purpose processors for any state and rely on state machines for each state instead.

If additional configuration is needed at some point, data processing temporarily ceases and the traffic processor 404 returns to the configuration state. Data for processing could be buffered or otherwise delayed until return to the traffic processing state once the configuration state completes. The traffic processor 404 flops between states and the program load circuit 112 loads the necessary soft cores to allow operation with a reduction in resources for the device.

Figure 4B:
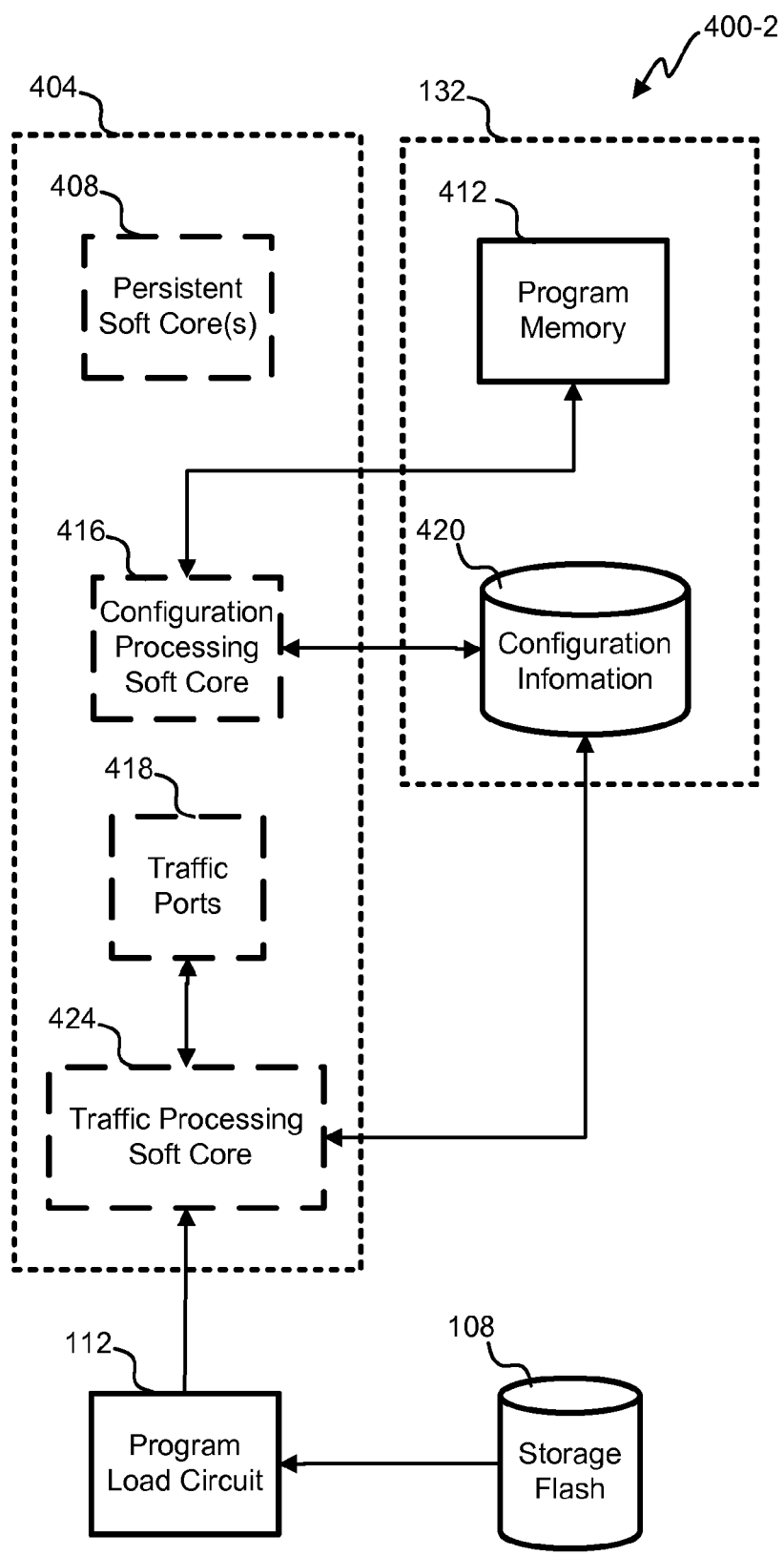

With reference to FIG. 4B, a block diagram of another embodiment of the traffic processing system 400-2 is shown. This embodiment uses a volatile memory 132 external to the FPLC implementing the traffic processor 404 to store the program memory 412 and the configuration information store 420. A memory interface (not shown) can be another soft core that is used to interact with the volatile memory 132.

Figure 4C:
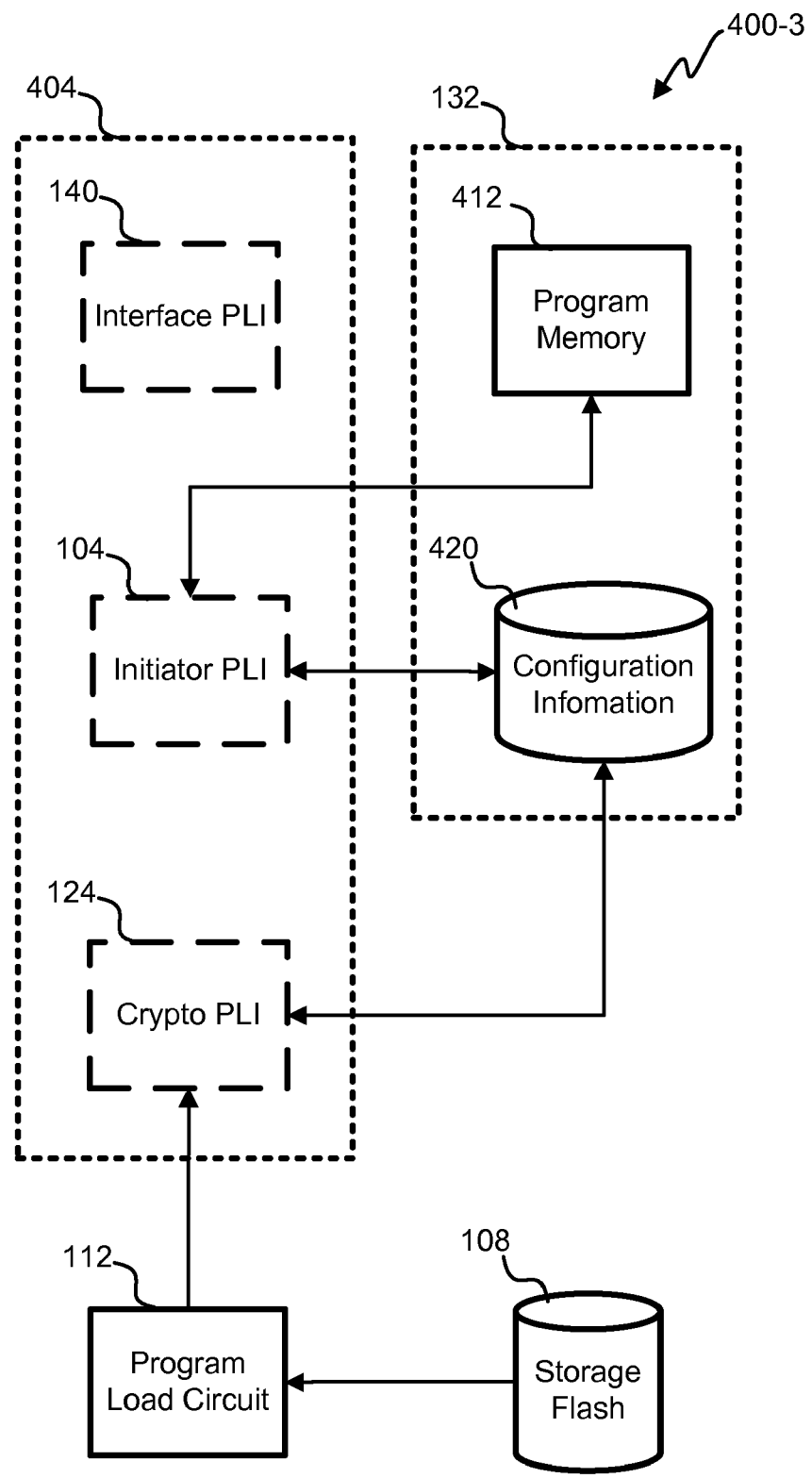

Referring next to FIG. 4C, a block diagram of yet another embodiment of the traffic processing system 400-3 is shown. This embodiment of the traffic processing system 400-3 has an initiator PLI 104 as its configuration processing soft core 416. Additionally, the traffic processing soft core 424 is replaced with the crypto PLI 124. The functionality of the initiator PLI 104 and the traffic processing soft core 424 is described above.

Figure 4D:
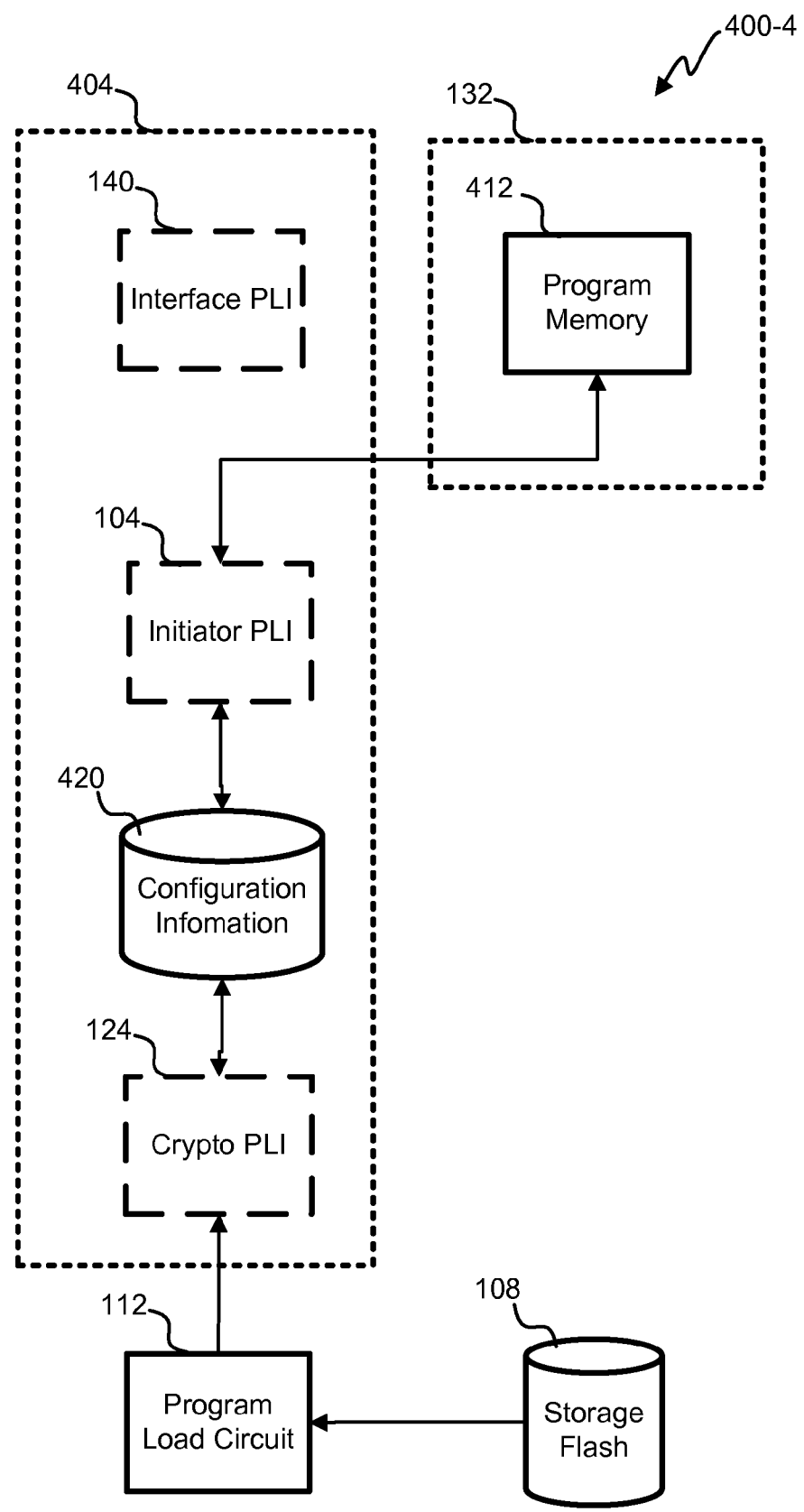

With reference to FIG. 4D, a block diagram of still another embodiment of the traffic processing system 400-4 is shown. In this embodiment, the configuration information store 420 is retained within the FPLC of the traffic processor 404. The FPLC could have embedded memory or could use a soft core to implement memory to hold the configuration information between states.

Figure 5A:
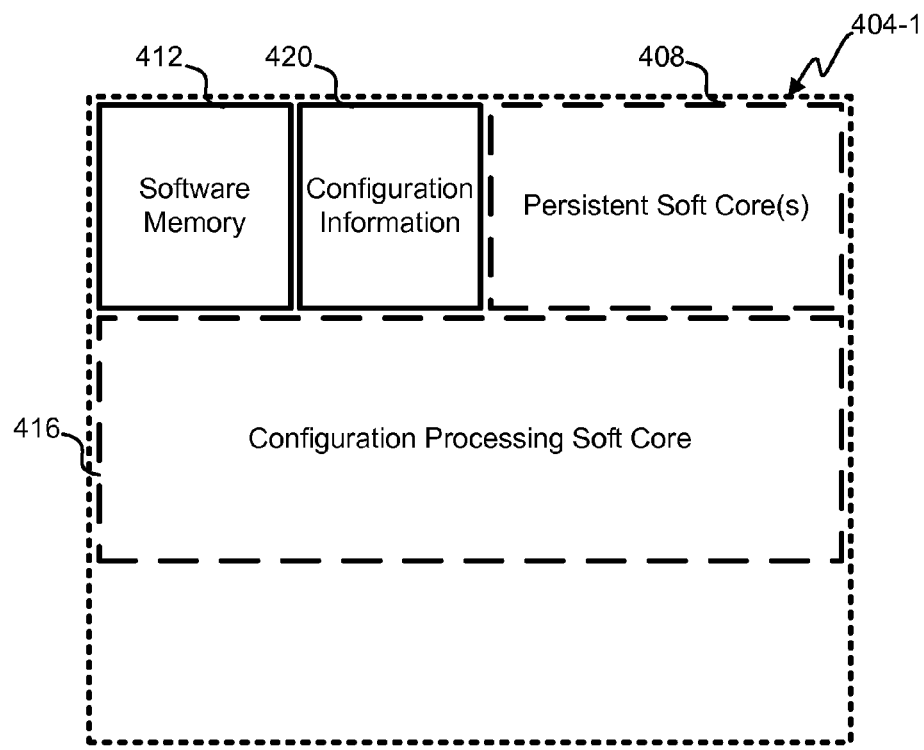
FIGS. 5A, 5B, 5C, 5D, 5E, 5F, 5G, and 5H depict diagrams of embodiments of a layout of a field-programmable logic chip (FPLC) implementing a traffic processor.
Figure 5B:
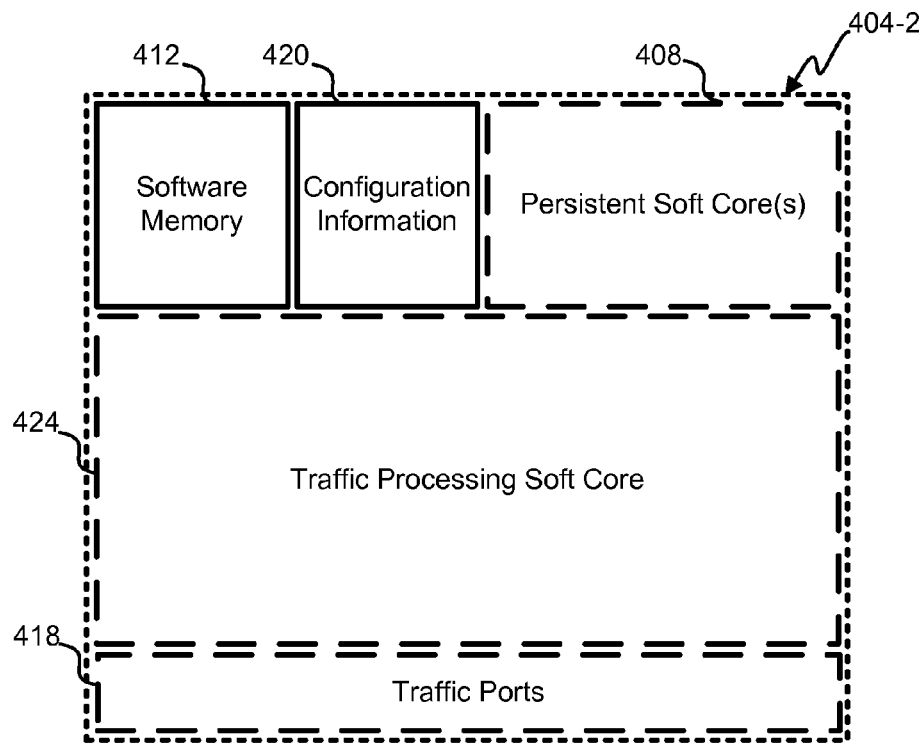

With reference to FIGS. 5A & 5B, diagrams of an embodiment of a layout of a traffic processor 404 is shown in two different states. This embodiment of the traffic processor includes memory within the FPLC. The memory is used to store the software memory 412 and the configuration information 420. FIG. 5A shows the loaded soft cores used in a configuration state, and FIG. 5B shows the soft cores loaded in a traffic processing state for this embodiment. The configuration state in FIG. 5A, has a persistent soft core 408, a configuration processing soft core 416 in addition to the onboard memory. In transitioning to the traffic processing state shown in FIG. 5B, the configuration processing soft core 416 is overwritten with a traffic processing soft core 424 and traffic ports 418. Traffic ports 418 are not used in the configuration state 604 as these traffic ports are used to pass traffic.

Figure 5C:
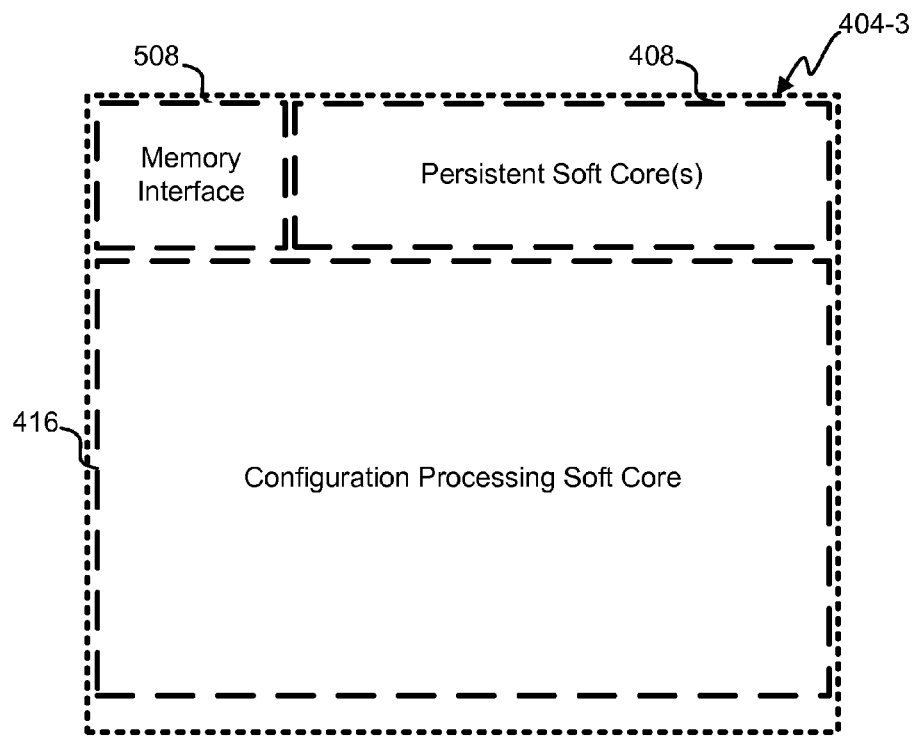
Figure 5D:
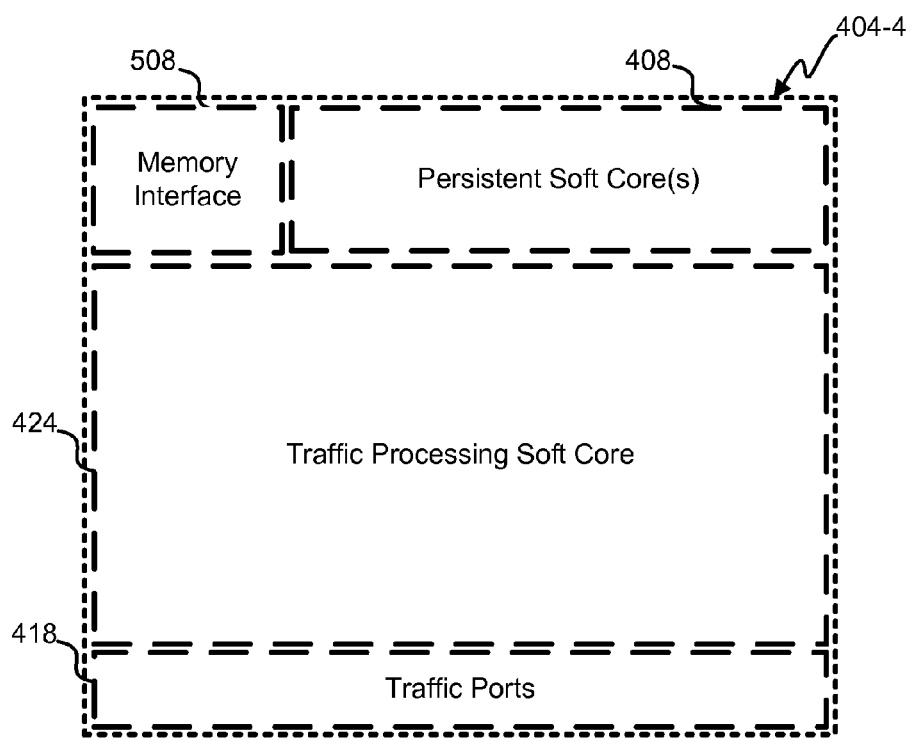

Referring next to FIGS. 5C & 5D, diagrams of another embodiment of a layout of a traffic processor 404 is shown in two different states. The layout of the soft cores in a configuration state is shown FIG. 5C, and the layout of the soft cores in a traffic processing state is shown in FIG. 5D. This embodiment uses an external battery-backed memory 106. A memory interface soft core 508 is present in both states to interface to the battery-backed memory 106. Processing can flip back and forth between the two states as necessary during normal operation. Certain soft cores partially or wholly overlap for different states.

Figure 5E:
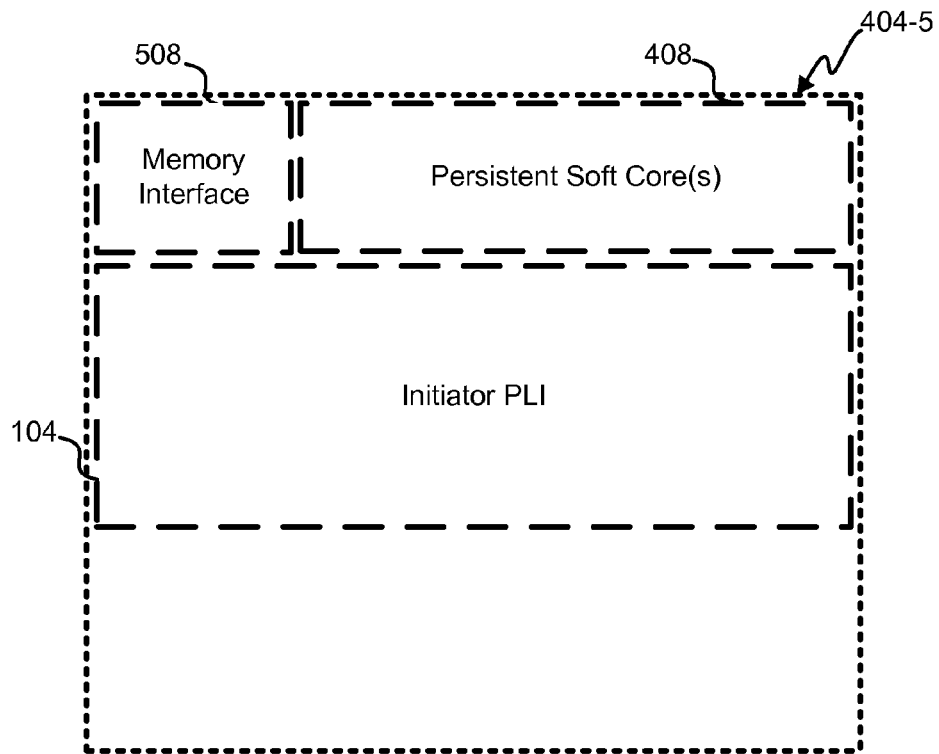
Figure 5F:
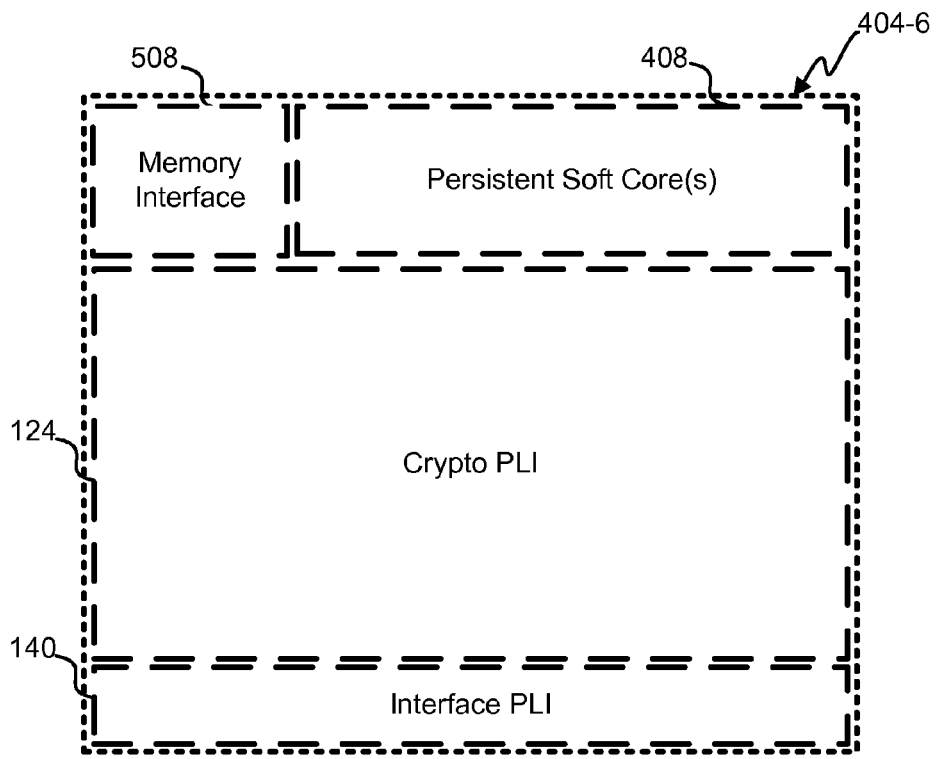

With reference to FIGS. 5E & 5F, diagrams of one embodiment of a layout of a traffic processor 404 is shown in two different states. This traffic processor 404 performs cryptographic processing, for example, using the cryptographic processor system 100. In a first state shown in FIG. 5E, an initiator PLI 104 is used to perform configuration, key management, etc. The crypto PLI 124 and interface PLI 140 are loaded in a second state in a manner that overlaps partially or wholly the initiator PLI 104. Operation can move between these states during normal operation of the traffic processor 404.

Figure 5G:
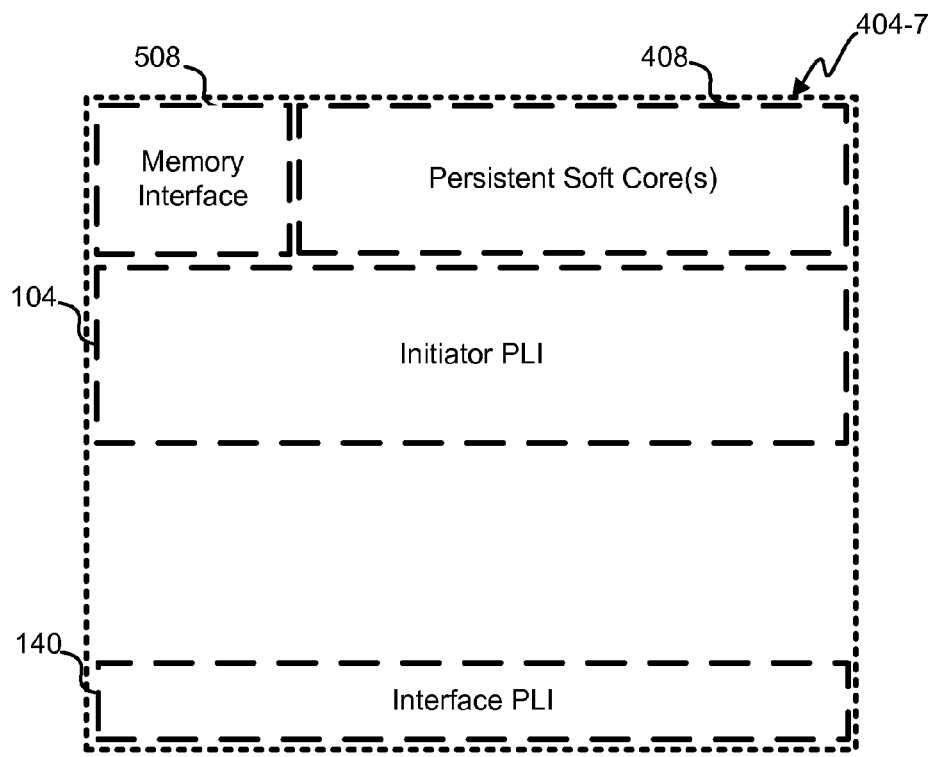
Figure 5H:
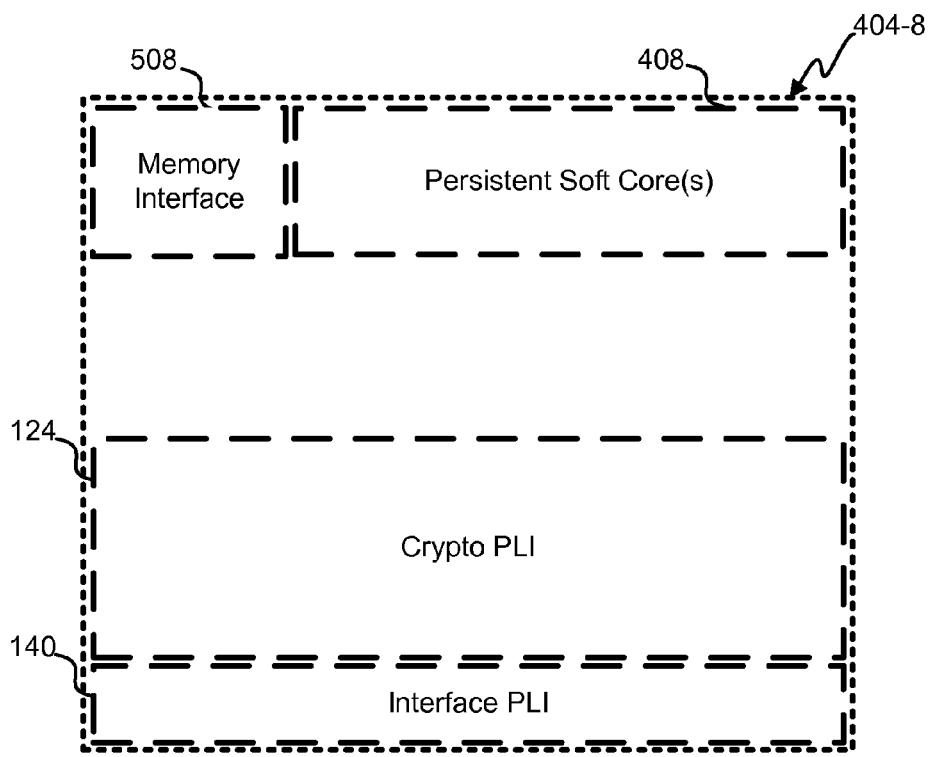

Referring next to FIGS. 5G & 5H, diagrams of another embodiment of a layout of a traffic processor 404 is shown in two different states. This traffic processor 404 performs cryptographic processing, for example, using the cryptographic processor system 100. Operation moves between at least two states, with one having an initiator PLI 104 loaded and the other having a crypto PLI 124 loaded. In this embodiment, there is no overlap between the PLIs swapped out between states. While in one state there are one or more PLIs that are inoperable unless there is a transition to the state that would use that PLI.

Figure 6A:
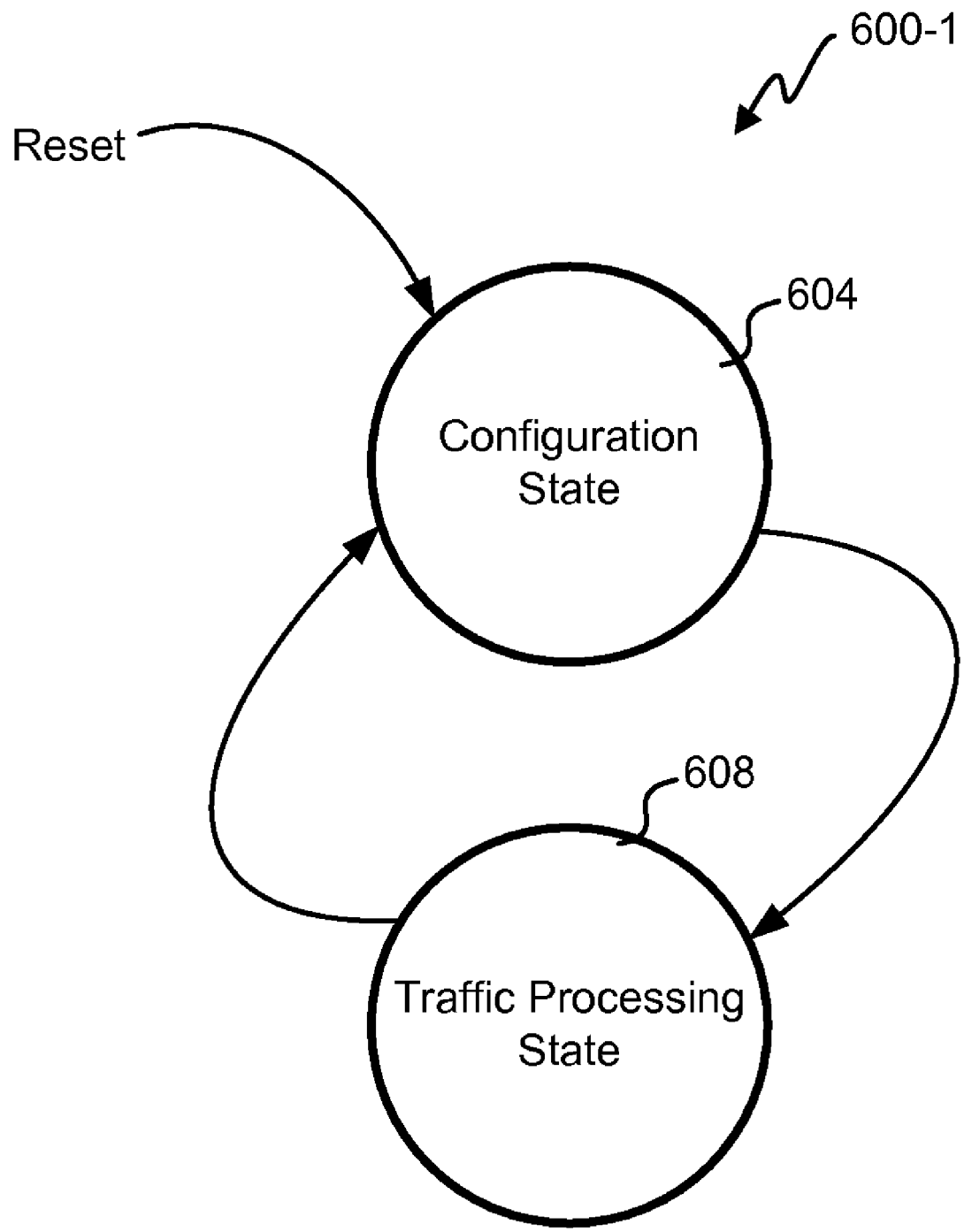
FIGS. 6A and 6B depict diagrams of embodiments of a state machine used to control the traffic processor.

Referring next to FIG. 6A, an embodiment of a state machine 600-1 used to control the traffic processor 404 is shown. This embodiment operates in two states, namely, a configuration state 604 and a traffic processing state 608. After reset or boot, processing enters the configuration state 604. Once configuration is complete, processing goes to the traffic processing state 608. When more configuration is needed, processing goes from the traffic processing state 608 to the configuration state 604 before returning back to the traffic processing state 608. Appropriate images are loaded into the device when switching between states. The size of the FPLC is dictated by the largest amount of logic in any state.

Figure 6B:
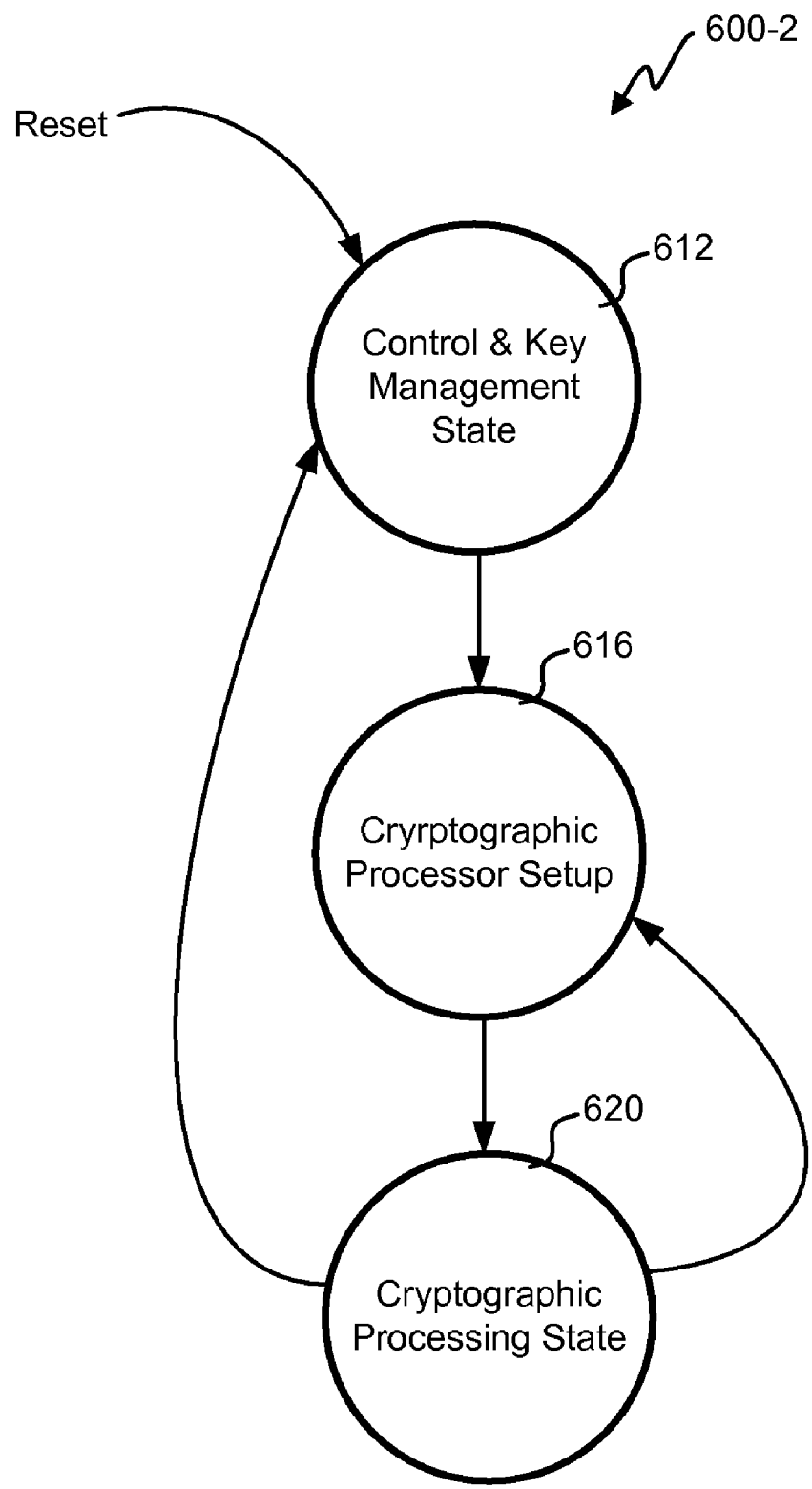

With reference to FIG. 6B, another embodiment of the state machine 600-2 used to control the traffic processor 404 is shown. This embodiment controls a cryptographic processor system 100 in three states. A control and key management state 612 and a cryptographic processor setup state 616 use a configuration processing soft core 416, but a cryptographic processing state 620 has no need for a general-purpose processor. Between each state, different soft cores can be loaded into the cryptographic processor system 100. In some embodiments, the control and key management state 612 and a cryptographic processor setup state 616 may use the same soft cores such that loading images between states is not required.

Figure 7:
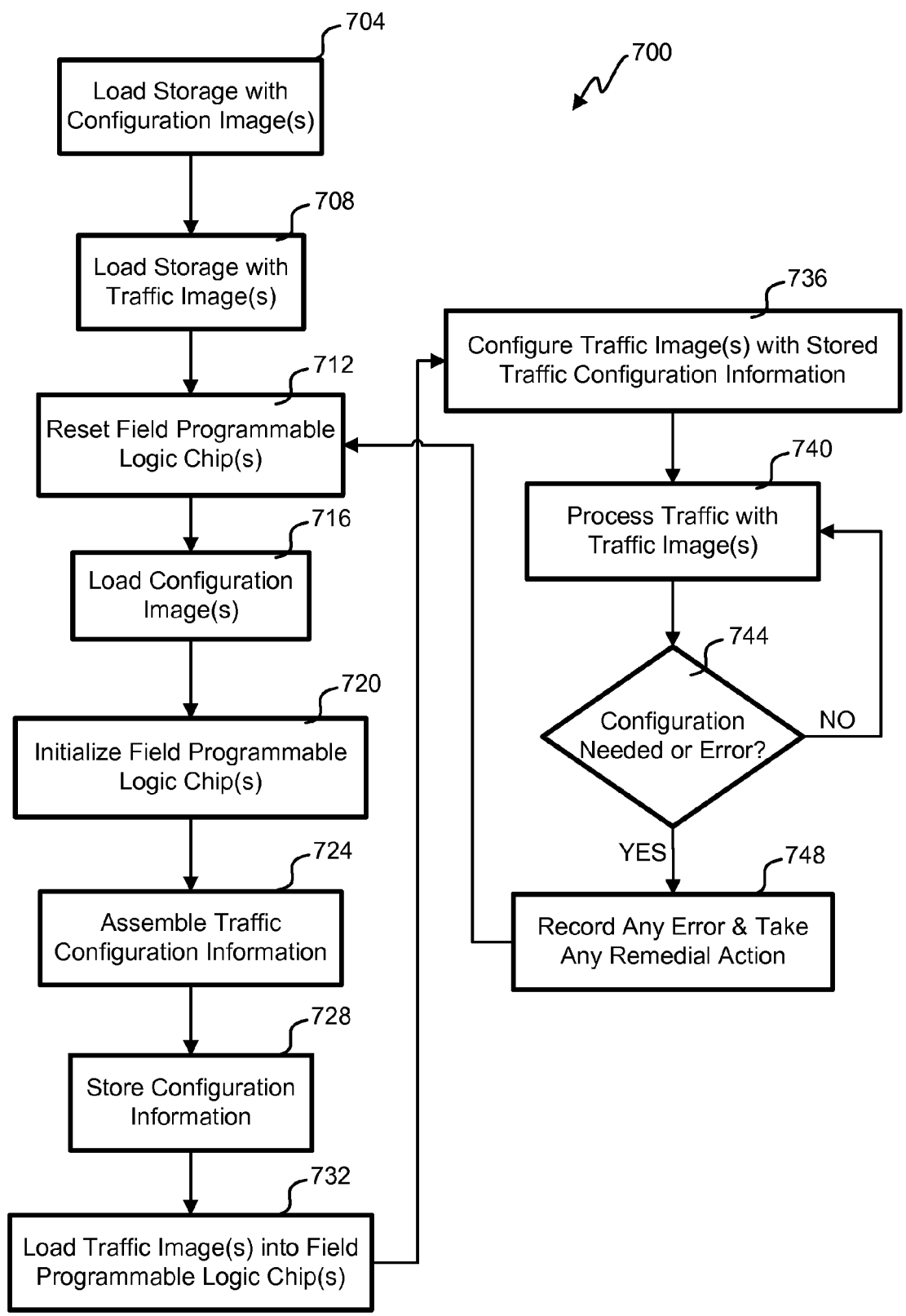
FIG. 7 illustrates a flowchart of an embodiment of a process for cryptographically processing information in a two state configuration.

Referring next to FIG. 7, an embodiment of a flow diagram showing a process 700 for cryptographically processing information in a two state configuration. The depicted portion of the process begins in block 704 where the storage flash 108 is loaded with configuration images used for the various soft cores. In block 708, the storage flash 108 is loaded with the traffic state images used in the various soft cores for that state. Additionally, software for a general purpose processing core can be loaded into the storage flash 108 or directly into the program memory 412.

Normal operation of the cryptographic processor system 100 begins in block 712 when the PLI or FPLC is reset or powered-up. The configuration image(s) are loaded into the device in block 716. The traffic processor 404 begins operation in the configuration state to initialize the PLIs in block 720 to begin the configuration state and assembles configuration information for use in other state(s) in block 724. The configuration information is stored in the configuration information store 420 in block 728.

Transitioning into block 732 activates the traffic processing state by loading traffic processing soft core(s) into the traffic processor 404. Loading of new soft cores may be preceded by overwriting and/or erasing of prior soft cores or may simply be accomplished by writing the new soft cores over the prior soft cores. In the traffic processing state, the traffic image is configured with the stored traffic configuration information upon activating the traffic processing soft core in block 736. Processing traffic takes place in block 740. Other embodiments could perform cryptographic processing in block 740, for example, using the cryptographic processor system 100. So long as configuration is not needed or errors are not detected in block 744, traffic processing continues. Any error detected in block 744 is recorded in block 748 before looping back to block 712 where the device is rebooted. Other embodiments could take any number of remedial measures depending on the error encountered, for example keys or a key layer(s) could be destroyed in a cryptographic application.

A number of variations and modifications of the disclosed embodiments can also be used. For example, functions that are implemented in PLIs could be performed in software. Code could be run on soft cores within a FPLC or a pre-programmed microprocessor circuit.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field-programmable gate arrays (FPGAs), soft core processors, hard core processors, controllers, micro-controllers, microprocessors, other electronic units designed to perform the functions described above, and/or a combination thereof. Software can be used instead of or in addition to hardware to perform the techniques, blocks, steps and means.

Also, it is noted that the embodiments may be described as a process which is depicted as a flowchart, a flow diagram, a data flow diagram, a structure diagram, or a block diagram.

Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for booting with multi-layered security that cryptographically processes information, the method comprising:
    loading a default image into a field-programmable logic chip (FPLC), wherein:
        the default image prevents the FPLC from passing information from a first port to a second port,
        the default image includes a first algorithm that is unclassified by the government, and
        the default image allows operational software to function;
    loading a multi-layered key, wherein:
        a first layer of the multilayer key is stored separate from a second layer of the multilayer key, and
        the first and second layers are used to formulate the multi-layer key;
    decrypting a protected image using the multi-layered key and the first algorithm to produce a decrypted image, wherein the protected image is encrypted;
    loading the decrypted image into the FPLC; and
    performing cryptographic processing using the decrypted image and a second algorithm, which is classified by the government, wherein the cryptographic processing operates on information passing from the first port to the second port.

2. The method as recited in claim 1, wherein the unclassified algorithm is software implemented.

3. The method as recited in claim 1, wherein the operation software is run on a processor external to the FPLC.

4. The method as recited in claim 1, wherein the unclassified algorithm is a soft core.

5. The method as recited in claim 1, wherein the loading the default image is performed after decrypting the default image on-chip within the FPLC.

6. The method as recited in claim 1, wherein the loading the multi-layer key includes loading the first and second layers of the multi-layered key from at least two different chips.

7. The method as recited in claim 1, wherein the FPLC includes a plurality of FPGAs.

8. The method as recited in claim 1, wherein the default image is isolated from the decrypted image within a single field-programmable gate array (FPGA).

9. A cryptographic processing system for booting a field-programmable logic chip (FPLC) with multi-layered keys, the cryptographic processing system comprising:
    a first port for receiving information for cryptographic processing;
    a second port for transmitting information after cryptographic processing;
    a default image loaded in the FPLC, wherein:
        the default image prevents the FPLC from passing information from a first port to a second port,
        the default image includes a first algorithm that is unclassified by the government, and
        the default image allows operational software to function;
    a multi-layered key, wherein:
        a first layer of the multilayer key is stored separate from a second layer of the multilayer key, and
        the first and second layers are used to formulate the multi-layer key;
    a protected image that is decrypted using the multi-layered key and the first algorithm to produce a decrypted image, wherein:
        the decrypted image is loaded into the FPLC, and
        cryptographic processing is performed using the decrypted image and a second algorithm, which is classified by the government, wherein the cryptographic processing operates on information passing from the first port to the second port.

10. The cryptographic processing system as recited in claim 9, wherein the unclassified algorithm is software implemented.

11. The cryptographic processing system as recited in claim 9, wherein the unclassified algorithm is a soft core.

12. The cryptographic processing system as recited in claim 9, wherein the loading the default image is performed after decrypting the default image on-chip within the FPLC.

13. The cryptographic processing system as recited in claim 9, wherein the loading the multi-layer key includes loading the first and second layers of the multi-layered key from at least two different chips.

14. The cryptographic processing system as recited in claim 9, wherein the FPLC includes a plurality of FPGAs.

15. The cryptographic processing system as recited in claim 9, wherein the default image is isolated from the decrypted image within a single field-programmable gate array (FPGA).

16. A cryptographic processing system for booting a field-programmable logic chip (FPLC) with multi-layered keys, the cryptographic processing system comprising:
 first means for loading a default image into a field-programmable logic chip (FPLC), wherein:
  the default image prevents the FPLC from passing information from a first port to a second port,
  the default image includes a first algorithm that is unclassified by the government, and
  the default image allows operational software to function;
 second means for loading a multi-layered key, wherein:
  a first layer of the multilayer key is stored separate from a second layer of the multilayer key, and
  the first and second layers are used to formulate the multi-layer key;
 means for decrypting a protected image using the multi-layered key and the first algorithm to produce a decrypted image;
 third means for loading the decrypted image into the FPLC; and
 means for cryptographically processing that uses the decrypted image and a second algorithm, which is classified by the government, wherein the cryptographic processing operates on information passing from the first port to the second port.

17. The cryptographic processing system as recited in claim 16, wherein the unclassified algorithm is software implemented.

18. The cryptographic processing system as recited in claim 16, wherein the unclassified algorithm is a soft core.

19. The cryptographic processing system as recited in claim 16, wherein the loading the default image is performed after decrypting the default image on-chip within the FPLC.

20. The cryptographic processing system as recited in claim 16, wherein the loading the multi-layer key includes loading the first and second layers of the multi-layered key from at least two different chips.

21. The cryptographic processing system as recited in claim 16, wherein the FPLC includes a plurality of FPGAs.

22. The cryptographic processing system as recited in claim 16, wherein the default image is isolated from the decrypted image within a single field-programmable gate array (FPGA).

\* \* \* \* \*